United States Patent [19]

Waymouth

[11] Patent Number: 4,895,420
[45] Date of Patent: Jan. 23, 1990

[54] HIGH REFLECTANCE LIGHT GUIDE

[75] Inventor: John F. Waymouth, Marblehead, Mass.

[73] Assignee: GTE Products Corporation, Danvers, Mass.

[21] Appl. No.: 235,086

[22] Filed: Aug. 22, 1988

[51] Int. Cl.$^4$ ............................ G02B 6/00; G02B 6/14
[52] U.S. Cl. .................................. 350/96.10; 350/96.33
[58] Field of Search ................ 350/96.32, 96.33, 96.10

[56] References Cited

U.S. PATENT DOCUMENTS

| | | | |
|---|---|---|---|
| 3,641,332 | 2/1972 | Reick et al. | 350/96.32 |
| 3,901,674 | 8/1975 | Strack et al. | 350/96.32 |
| 4,149,772 | 4/1979 | Iyengar et al. | 350/96.33 |
| 4,265,515 | 5/1981 | Kao | 350/96.33 |
| 4,372,648 | 2/1983 | Black | 350/96.33 |

Primary Examiner—William L. Sikes
Assistant Examiner—Robert E. Wise
Attorney, Agent, or Firm—William E. Meyer

[57] ABSTRACT

A high reflectance light guide may be inexpensively made by rolling a thin transparent plastic film to form a tube. The tube is formed with multiple layers of the plastic material, and air entrained between the layers of plastic. When the plastic material and the separating layers of air have thicknesses that are approximately equal, there is a high degree of reflectance at the plastic and air interface. Light can then be directed along the interior of the tube with little light loss. Light may then be efficiently distributed over an extended distance with little material cost.

18 Claims, 2 Drawing Sheets

HIGH REFLECTANCE LIGHT GUIDE

TECHNICAL FIELD

The invention relates to light reflectors and particularly to light reflectors used in light guides. More particularly the invention is concerned with a light guide having a reflective surface formed from multiple layers of material and air.

BACKGROUND ART

It is known in the prior art to produce light at a source and then transport the light by a light guide to a distant location where the light is used. Light guides generally have the form of a hollow structure with a reflective surface formed along an inner wall of the guide. By generating light in the hollow cavity, the light is transported by reflection along the inner wall. The light is delivered by aiming the guide at the target area, or opening a hole in the wall and reflecting light out to the target area. An example is provided by U.S. Pat. No. 4,459,642 to Kei Mori for an Optical Lighting Device. The example shows multiple coaxial tubes having reflective internal surfaces, and numerous openings along the tubes to release the light guided by internal reflections. There are several advantages to distributing light by a light guide. A single efficient source may be used instead of numerous less efficient sources. Fewer sources means fewer electrical connections, and less related electrical equipment.

Two important conditions affect efficient transport in a light guide. The source should produce light in a narrow beam, which maye taken as a beam half-angle of a few degrees. A broad beam has light with a small angle of incidence, which results in multiple reflections and therefore a large light los, since there is a loss occurring at each reflection. A narrow beam, directed axially in the guide, results in fewer reflections, each having a high angle of incidence called a grazing angle. The preferred beam is then narrow, generally parallels the guide walls to forming grazing reflections, and therefore has a few reflections as possible.

A second influential aspect is the reflectivity of the walls. Since a loss occurs with each reflection, a high reflectivity at grazing angles is importanat. Unfortunately, metallic reflectors do not have high reflectance at grazing angles. Most metallized films, and even polished anodized aluminum, have reflectances of less than 95% at perpendicular incidence; and at grazing incidence, the reflectance percentage drops even lower, to 70 or 80 percent. Enhanced reflectors are known, in which a metallized film is overcoated with a transparent layer having a precise thickness relative to a particular wavelength of light. The film over metal light guides can achieve reflectances of greater than 95% for normal incidence. While it is theoretically possible to further enhance reflectance for grazing angles, the enhancement is normally limited to only one color, and one angle of incidence. The enhanced film on metal light guide is then much less effective for the range of grazing angles produced by most radiating sources, and also for the spectrum of white light normally produced and desired. There is then a need to provide an enhanced reflector effective over a range of grazing angles, and there is a need to provide alight guide with enhanced reflectivity for a broad range of wave lengths. There is a further need for a wall material for use in light guide systems having high reflectance at grazing angles that is economical and adaptable to simple manufacturing processes.

DISCLOSURE OF THE INVENTION

A wall material having high reflectance at grazing angles may be formed from alternating transparent layers of two of materials having high and low indexes of refraction. Alternatign layers of two plastic sheet types, or a plastic sheet and air are easily, and economically formed into a high reflectance light guide.

BEST MODE FOR CARRYING OUT THE INVENTION

Figure 1:
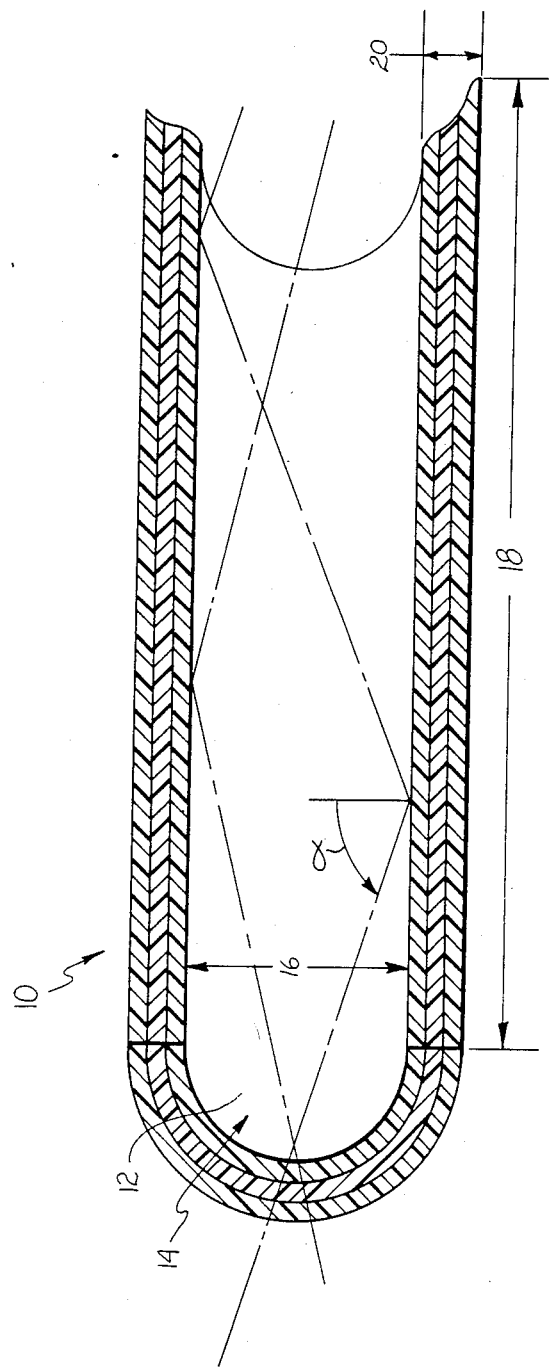
FIG. 1 shows a cross-section of a preferred embodiment of a high reflectance tubular light guide.
Figure 2:
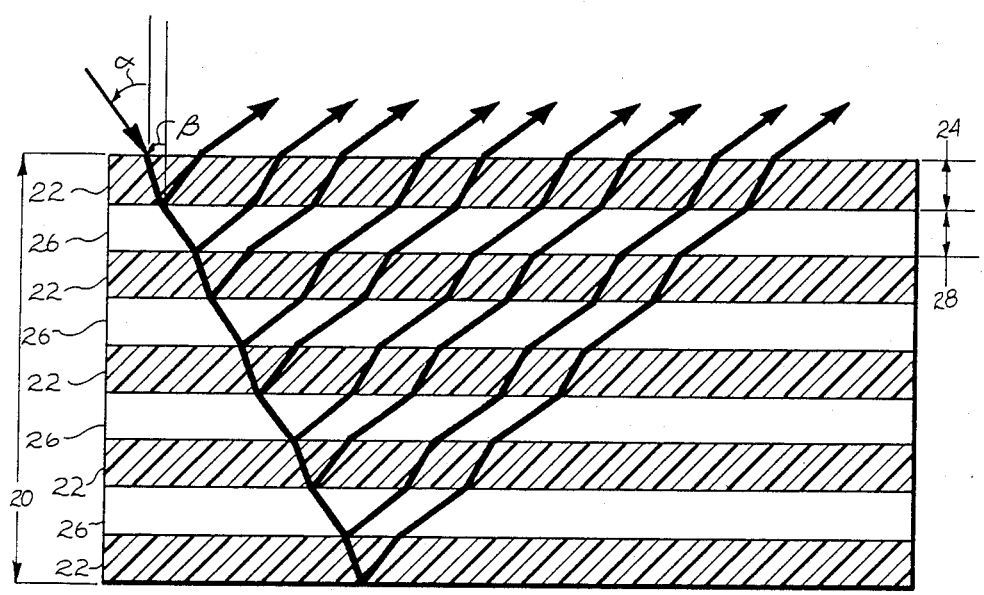
FIG. 2 shows a schematic cross-section of a preferred embodiment of a high reflectance surface.

FIG. 1 shows in cross-section a preferred embodiment of a light guide. The preferred light guide is formed as a tube 10 having an internal reflective wall 12 enclosing an open central cavity 14. The reflective wall 12 is arranged generally to be parallel and concentric with the tube axis. The preferred tube has a reflective wall 12 that is curved concentrically in a circular form about the tube axis. The cavity diameter 16 may be determined substantially by convenient manufacture, and practicacl aspects of installation. Generally, in traversing a given distance along the tube 10, the larger the cavity diameter 16, the fewer the reflections and therefore the lower the light loss. A large cavity diameter 16 allows the source light to diffuse over the greater cross-sectional area, and as a result, a less intense beam is available for output. Also, the larger the cavity diameter 16, the larger the physical space occupied by the whole guide, and the more cumbersome the guide becomes to manufacture and use. Making the tube 10 with a smaller cavity diameter 16 results in a larger number of reflections, and therefore a greater loss, but nonetheless, tends to preserve the intial light intensity, reduces cost, eases manufacture, and increases applicability. Increasign the reflectivity of the reflector wall 12 reduces the light loss resulting from the greater number of reflections in a narrower tube.

The tube 10 has an overall length 18 which is again generally determined by convenient manufacture, and the needs of actual application. The allowable tube length 18 is related to the source beam width, the reflectance of the tube wall 12, and the tube diameter 16. It is expected that light guides with lengths of at least a hundred or more cavity diameters 16 are possible with the present method. These aspects are generally understood in the art, and explanation is not felt to be necessary for understanding the teaching made here.

The tube wall 12 has a wall thickness 20 and is formed from a multiplicity of first layers 22 of a first material having a first index of refraction $R_1$ and a first layer thickness 24. The first material is preferred to have an index of refraction $R_1$ greater than 1.3, and generally as high as possible. The first layres 22 are adjacent and alternate with second layers 26 of a second material having second layer thickness 28, and a second index of refraction $R_2$. The first index of refraction $R_1$ is chosen not equal to the second index of refraction $R_2$. The second index of refraction $R_2$ should be as small as possible to form the largest possible difference with the first index of refraction $R_1$. A reflection occurs at the interface between the two layers. The first layers 22 and second layers 26 may both be solid materials, and it is convenient that the materials for both layers be flexible.

In the preferred embodiment the first layer 22 material is a thin layer of a flexible and substantially transparent plastic material. Flexibility allows the plastic sheeting to be conveniently rolled into a tubular form. It is of course possible to use less flexible materials, and create the numerous layers by stacking or other means, and such a process is anticipated here for reflector forms having shapes other than the preferred tube described. Since reflection occurs at the interface, while absorption occurs internally, the layers should be as thin as possible in comparison to the absorption depth of the material, thereby yielding the largest number of reflective interfaces per quantity of absorbing material. The thinnest acceptable layer is thought to be somewhat larger than a wavelength or two of the longest acceptable wave to be reflected, thereby avoiding constructive or destructive interference of particular wavelengths. The layer thicknesses here are not quarterwave reflectors, as are seen in dichroic coatings. The result is then not a selective reflectance of particular wavelengths, but a general reflectance. Practically, the thickness of the thinnest plastic sheeting that can currently be manufactured and handled, is about 6 microns, which s about ten times the wavelength of visible light even at perpendicular incidence.

In the other direction, the layers maay be as thick as is functionally useful. As the layers becomes thicker, progressively more light is absorbed in the material, so there are relatively fewer reflecting layers for a given tube wall thickness 20. The reflective wall 12 is then a less efficient reflector. The first layer thickness 24 should then be thin with respect to the absorption depth of the material, and should not be so great as to absorb 1.0% of the light in transiting one layer. The efficient reflector then has the least amount of material, and the largest number of layers as is possible without letting the layers become so thin as to be interference layers. The currently preferred material is a thin plastic polyester sheeting (Mylar) commercially available as a clear wrapping material having a thickness of about $6.35 \times 10^{-3}$ mm ($2.5 \times 10^{-4}$ inch = 0.25 mil). The plastic sheeting has an index of refraction of about 1.6. The material is rolled in air to fifty or more layers. A tube of fifty layers of material and air each having a thickness of about $6.35 \times 10^{-3}$ mm is then approximately 0.635 mm thick with included air. The plastic layers do not attract, stick or cling to each other, therefor preserving the layers of air between the plastic layers. If the plastic first layers 22 were to stick one to another, the second layers 26 of air would be driven out, and there would be little or no reflective interface at the sticking points.

The preferred second layer 26 material is an approximaately equally thin layer of a gas. The intermediate second layers 26 are conveniently formed as layers of air, although other gases might be used if desired. Gases in general, and air in particular have a index of refraction les than that of plastic, so a reflection occurs at each plastic to air interface. The second layer thickness 28 may of course be smaller than the thinnest first layer when the second layer material is a gas.

The second layer material might also be a plastic sheeting with a index of refraction $R_2$ less than the refraction $R_1$ of the first layer 22. Using two different plastic materials is not thought to be as effective as plastic and air, since the indexes of refraction are likely to be similar resulting in less of a reflection at the interfaces. Absorption is also likely to increase. Tube strength of course would likely be enhanced.

The successive layers should in general be oriented in parallel one with another. The tube 10 then may be conveniently formed by rolling plastic sheeting in air with a tension sufficient to allow air to be entrained between the layers of the rolled plastic. In the wrapped tube 10, each layer is generally parallel with the preceding, and successive layers. There may be some variation from exact parallelism between layers; however such variation is not thought to detrimentally affect the overall performance of the light guide.

The number of reflective layers is moderately important. Each additional layer reflects some of the transmitted light back to the tube cavity 14, transmits some of the light on to the next layer, and absorbs a small portion of the light. A layer of one has no more advantage than a coated tube. As the number of layers increases the total percentage of reflection back to the tube cavity increases. Each additional layer adds only a small additional reflection, but ultimately a high percentage of reflection may be reached when many layers are used.

The amount of total reflection is approximately proportional to one minus the reflectance of one layaer raised to the power of the number of the layers. At each surface, a small reflection occurs. If the plastic and air layers are thin enough, little or no absorption occurs in transiting the layer to the next interface. If each air to plastic iinterface has a reflectance of 5%, the total percentage of transmittance of one layer ($=1-R$ if no absorption) is 90%, since there are two interfaces. A stack of twenty-five such layers having fifty reflective interfaces, has a transmittance of about 7% ($0.95^{50}$), or a reflectance of about 93% ($1-0.95^{50}$) in the absence of absorption. A stack of fifty layers with a hundred reflective interfaces would have a reflectance of 99.5% ($1-0.95^{100}$). No materials have zero absorption, and the performances of actual wall 12 structures is likely somewhat poorer than started.

An advantage of the multilayer plastic film reflector is that unlike metal films, the reflectance at an air to plastic interface increases at grazing incidence. Thus, the closer to grazing, the higher the reflectance percentage. Generally, the reflectance provided by the fiftieth and successive layers is felt to be insignificant. The use of additional layers may nonetheless be useful in providing overall strength to the tube 10.

The wrapped light guide has been found to have sufficient strength to be structurally useful. An exterior shell, or coating may be used to enclose the wrapped tube for additional strength, attachment, coupling, or cosmetic purposes. Alternatively, an adhesive, or hardening material may be applied between the final layers of the wrap in place of the aiar separation to form a tougher exterior surface. The tube ends, and other tube openings may similarly be treated to prevent fraying of exposed layers. Internal supports may also be included in the wrappings. Such supports might include thin transverse rings, coaxial helixes, or axial rods. Such strengtheners should be offset from the internal reflective surface as much as possible to maximize the reflective efficiency of the tube 10.

A test example of a high reflectance light guide waas formed by first wrapping a slip layer of 4 mil polyester film on a 17.78 cm (7 inch) ddiameter 121.9 cm (4 foot) mandrel. A commercially available polyester wrapping film (Mylar) was selected as the first layer material. When viewed as originally provided, the tightly wound roll of polyester film could be clearly seen into for several inches. The clear depth of the film was then estimated to be several thousand layers, indicatign the material was more than substantially transparent. Fifty layers of the $2.336 \times 10^{-2}$ mm (0.92 mil) polyester film were then wound loosely by hand over the eslip layer to form a reflective wall about 2.54 mm (0.1 inch) thick. The winding waas loose enough that air in a layer estimated to apaproximatelye quala the film thickness waas entrained between the reflective layers of the polyester film. Three or four layers of single sided corrugated cardboard were then wrapped on the exterior of the reflective layers of the light guide to strengthen the reflective layers. The reflective layers and cardboard layers were then removed from the mandrel nd the slip layer of polyester film. Four circumferential rings of ten radial holes each were then formed alognthe length of the guide. Two rings were displaced about 10.1 cm (4.0 inches) from the guide ends, while the other two rings were place symmetricallya nd equidistance along the enter of othe tube. Flexible plastic pieces with T shaped ends were fitted through the radial holes to the inner cavity of the light guide. The plastic pieces were then tensioned so the T ends pulled the reflective layers radially to teh cardboard layers. With the above test example, reflectances greater than 95% were achieved with grazing angles of 2°. The disclosed operating conditions, dimensions, configurations and embodiments are as examples only, and other suitable configurations and relataions maybe used to implement the invention.

While there have been shown and described what are at present considered to be the preferred embodiments of the invention, it will be apparent to those skilled in the art that various changes and modifications can be made herein without departing from the scope of the invention defined by the appended claims.

I claim:

1. A light reflector comprising: A multiplicity of separable sheets of a first flexible, and substantially transparent material having a first index of refraction, and first layer thickness, mutually aligned to be substantially parallel, adjacent and separated one from another by layers of a second flexible, and substantially transparent material having a second index of refraction not equal to the first index of refraction, and a second layer thickness, to form a stack of alternating layers to reflect incident light.

2. The light reflector in claim 1, wherein the number of material layers exceeds two.

3. The light reflector in claim 1, wherein the layers are arranged concentrically about an axis.

4. The light reflector in claim 1, wherein the layers are curved concentrically about an axis.

5. The light reflector in claim 1, wherein the layers are arranged in a circle concentricallya bout an axis.

6. The light reflector in claim 1, whereinthe index of refraction for the first material is greater than 1.3.

7. The light reflector in claim 1, wherein the sheets are a plastic material.

8. The light reflector in claim 7, whereinthe sheets are a polyester film material.

9. The light reflector in claim 1, wherein the sheet thickness is about a $6 \times 10^{-3}$ mm to about 0.1 mm.

10. The light reflector in claim 1, wherein the second layer material is a gas.

11. The light reflector in claim 10, wherein the first layer material is a plastic material not drawn to a second layer of the same material so as to exclude an intermediate layer of the gas.

12. The light reflector in claim 1, wherein the gas is air.

13. The light reflector in claim 1, wherein the first layer thicknes is approximately equal to the second layer thickness.

14. The light reflector in claim 1, wherein the first layer thickness is greater than a wavelength of the longest wavelenglth light to be reflected, and less than an absorption depth of 1.0% for the first layer material.

15. A light guide reflector comprising a tube having internally reflective walls enclosing an open central cavity, the walls being composed of multiple layers of transparent plastic film having a single layer thickness less than would absorb one percent of light transiting the layer, and greater than a single wavelength of the transiting light spaced apart by layers of gas having a thickness from approximately a single wavelength of the transiting light to the film thickness.

16. The light reflector in claim 15, wherein the walls have a total thickness of between 10 and 1000 layers of the film material.

17. The light reflector in claim 16, wherein the walls have aa total thickness of between 25 and 100 layers of the film material.

18. A light guide comprising:

A multiplicity of layers of a substantially transparent, flexible plastic material having a first index of refraction, and a first sheet thickness, arranged in a curved form concentrically about an axis to define an enclosed cavity, and mutuallyaligned to be parallel, adjacent and separated one from another by layers of a gas having a second index of refraction not equal to the first index of refraction, and the second layer thickness being approximately equal to the first layer thickness thereby forming a stack of alternating layers to reflect incident light in the defined cavity.

* * * * *

UNITED STATES PATENT AND TRADEMARK OFFICE
CERTIFICATE OF CORRECTION

PATENT NO. : 4,895,420
DATED : January 23, 1990
INVENTOR(S) : John F. Waymouth

It is certified that error appears in the above-identified patent and that said Letters Patent is hereby corrected as shown below:

Col. 1, line 33 "maye" should be "may be"
Col. 1, line 36 "los" should be "loss"
Col. 1, line 42 "a" should be "as"
Col. 1, line 45 "importanat" should be "important"
Col. 1, line 65 "alight" should be "a light"
Col. 2, line 8 "Alternatign" should be "Alternating"
Col. 2, line 29 "practicacl" should be "practical"
Col. 2, line 44 "Increasign" should "Increasing"
Col. 2, line 63 "layres" should be "layers"
Col. 3, line 30 "maay" should be "may"
Col. 3, line 57 "approximaately" should be "approximately"
Col. 3, line 61 "les" should be "less"
Col. 4, line 26 "layaer" should be "layer"
Col. 4, line 31 "iinterface" should be "interface"
Col. 4, line 41 "started" should be "stated"

UNITED STATES PATENT AND TRADEMARK OFFICE
CERTIFICATE OF CORRECTION

PATENT NO. : 4,895,420

DATED : January 23, 1990

INVENTOR(S) : John F. Waymouth

It is certified that error appears in the above-identified patent and that said Letters Patent is hereby corrected as shown below:

Col. 4, line 56 "aiar" should be "air"

Col. 4, line 65 "waas" should be "was"

Col. 4, line 67 "ddiameter" should be "diameter"

Col. 5, line 5 "indicatign" should be "indicating"

Col. 5, line 8 "eslip" should be "slip"

Col. 5, line 10 "waas" should be "was"

Col. 5, line 11 "apaproximatelye quala" should be "approximately equal"

Col. 5, line 11 "waas" should be "was"

Col. 5, line 18 "nd" should be "and"

Col. 5, line 20 "alognthe" should be "along the"

Col. 5, line 23 "symmetricallya nd" should be "symmetrically and"

Col. 5, line 24 "enter" should be "center"

UNITED STATES PATENT AND TRADEMARK OFFICE
CERTIFICATE OF CORRECTION

PATENT NO. : 4,895,420

DATED : January 23, 1990

INVENTOR(S) : John F. Waymouth

It is certified that error appears in the above-identified patent and that said Letters Patent is hereby corrected as shown below:

Col. 5, line 24 "othe" should be "the"
Col. 5, line 28 "teh" should be "the"
Col. 5, line 33 "relataions maybe" should be "relations may be"
Col. 6, line 4 "concentricallya bout" should be "concentrically about"
Col. 6, line 5 "whereinthe" should be "wherein the"
Col. 6, line 9 "whereinthesheets" should be "wherein the sheets"

Col. 6, line 22 "thicknes" should be "thickness"
Col. 6, line 26 "wavelenglth" should be wavelength"
Col. 6, line 41 "aa" should be "a"
Col. 6, line 48 "mutuallyaligned" should be "mutually aligned"

Signed and Sealed this

Twenty-sixth Day of June, 1990

Attest:

HARRY F. MANBECK, JR.

*Attesting Officer*   *Commissioner of Patents and Trademarks*